March 20, 1962 T. A. BUCHHOLD 3,026,151
BEARING CONSTRUCTION
Filed Jan. 15, 1958 6 Sheets-Sheet 1
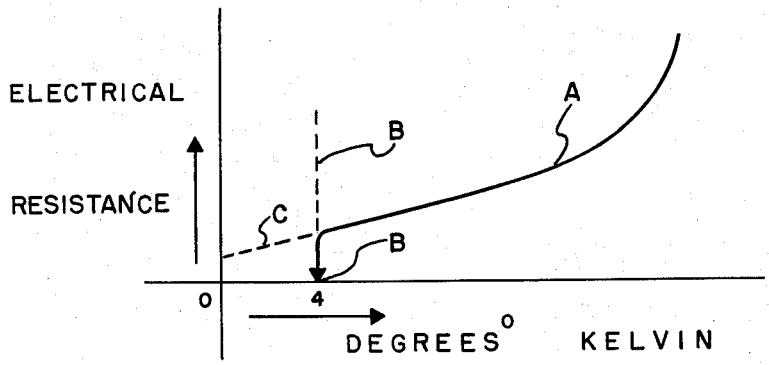
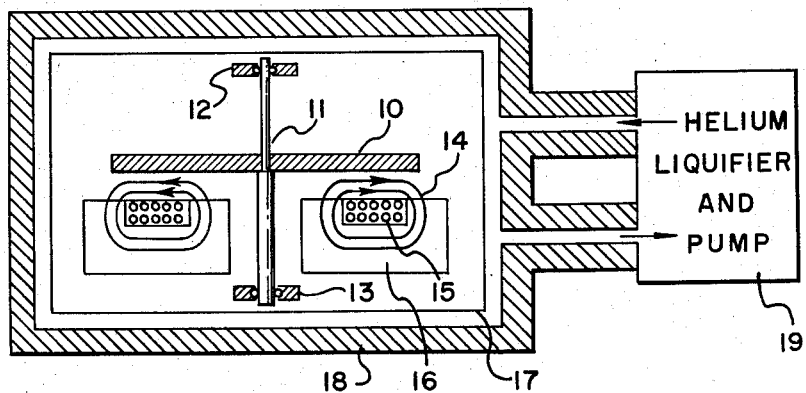
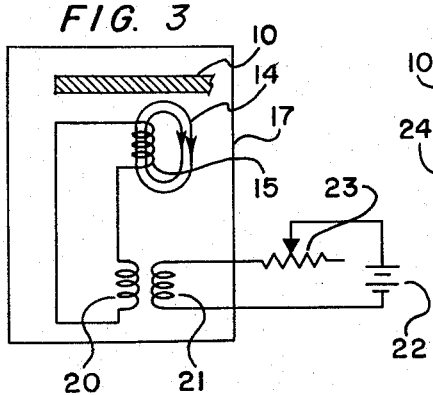
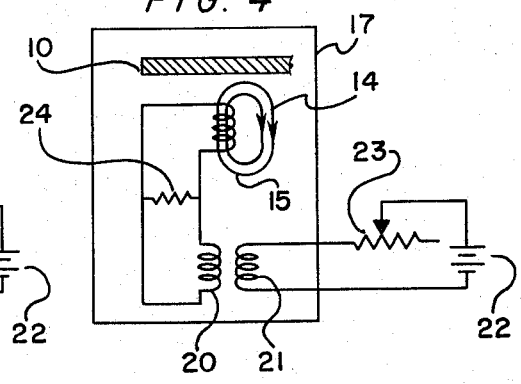
Inventor
THEODOR A. BUCHHOLD
by Alfred B. Levine March 20, 1962 T. A. BUCHHOLD 3,026,151
BEARING CONSTRUCTION
Filed Jan. 15, 1958 6 Sheets—Sheet 2

Inventor
THEODOR A BUCHHOLD
BY Alfred B. Levine

March 20, 1962 T. A. BUCHHOLD 3,026,151
BEARING CONSTRUCTION
Filed Jan. 15, 1958 6 Sheets-Sheet 3

Inventor
THEODOR A BUCHHOLD
BY Alfred B. Levine

Inventor
THEODOR A BUCHHOLD
BY Alfred B. Levine

March 20, 1962 T. A. BUCHHOLD 3,026,151
BEARING CONSTRUCTION
Filed Jan. 15, 1958

Inventor
THEODOR A. BUCHHOLD
BY Alfred B. Levine

March 20, 1962     T. A. BUCHHOLD     3,026,151

BEARING CONSTRUCTION

Filed Jan. 15, 1958            6 Sheets-Sheet 6

Inventor
THEODOR A. BUCHHOLD
By Alfred B. Levine

United States Patent Office 3,026,151
Patented Mar. 20, 1962

3,026,151
BEARING CONSTRUCTION
Theodor A. Buchhold, Schenectady, N.Y., assignor to General Electric Company, a corporation of New York
Filed Jan. 15, 1958, Ser. No. 709,118
27 Claims. (Cl. 308—10)

This invention generally relates to improved bearings for interconnecting relatively movable members and more particularly to bearings of superior accuracy and stability having low energy losses.

With increasing emphasis being placed on accuracy and sensitivity, particularly in the instrument and control fields, the inherent limitations of mechanical-type bearings have become increasingly apparent and considerable effort has been directed toward reducing the friction and other losses associated with these basic elements. For example, considerable development has been directed toward employing air supported bearings, magnetically suspended bearings, or electrostatically suspended bearings all to the end of reducing or eliminating the friction of sliding surfaces. Additionally, fluid buoyancy suspensions have been used in gyroscopic devices and other instruments to lower the weight of the member on its mechanical bearings and hence minimize bearing friction losses.

However known constructions using air or fluid suspensions to reduce pressure on the bearing surfaces are not completely satisfactory since they only tend to reduce but do not eliminate mechanical sliding friction and, in addition, introduce other losses including air or other fluid viscous friction. Magnetically suspended bearings, on the other hand, are generally unstable and require compensating means such as rapidly operating feedback equipments. Practical embodiments of electrostatic suspension bearings, which seemed to offer great promise, require great precision in manufacture and extremely high voltages to provide the necessary lifting forces to maintain the minimum necessary tolerances between the moving parts. Furthermore all known electrically operated type suspensions provide electrical losses in the form of eddy currents.

To overcome these disadvantages in accordance with the present invention, there is provided a unique form of electrical suspension bearing which may be termed "electrical pressure" support which not only substantially eliminates mechanical friction associated with relatively slidable surfaces, but also the electrical type losses, instabilities, and inaccuracies associated with known electrical-type suspensions. More particularly, there is provided a stable means for suspending a rotatable or movable member out of contact with its support or alternatively only partially in contact with its support by an electro-magnetic type force having unique characteristics providing a considerably greater lift than known electrostatically operating means using the same voltage as well as substantially eliminating the electrical losses and instabilities associated with known magnetic-type suspensions.

It is accordingly one object of the present invention to provide a substantially lossless and stable bearing for movably connecting two members.

A further object is to provide such a bearing that may be readily manufactured without the extreme precision needed in certain other known bearing constructions.

A still further object is to provide such a bearing that is stable for long periods of time and in all directions and that does not require outside feedback or other control means to maintain stability.

Other objects and many attendant advantages will be more readily apparent to those skilled in the art upon a detailed consideration of the following specification taken with the accompanying drawings wherein:

FIG. 1 is a chart generally illustrating the superconductive characteristic of certain materials employed by the present invention, FIG. 2 is a schematic cross-sectional view of a bearing structure employing the present invention along one axis, FIGS. 3 and 4 are electrical schematic drawings of circuits for the structure of FIG. 3, FIG. 5 is a cross-sectional view illustrating a modification of the bearing structure of FIG. 2, FIGS. 6, 7A and 7B illustrate further modifications of the bearing structure of FIG. 2, FIG. 8 is a chart illustrating the effect of both magnetic field and temperature on "superconductive materials,"

Figure 5:
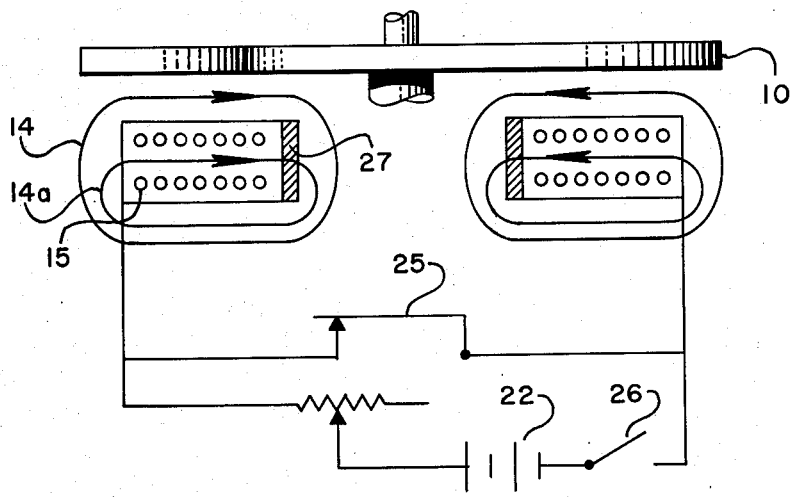

It has been found that a number of very pure materials exhibit the property of becoming electrically "superconductive" at low temperatures. That is, they appear to lose all resistance to the flow of electrical current. Study and actual measurement has shown that the change from a finite electrical resistance to no resistance at all, occurs at a certain low temperature as shown by FIG. 1. Thus, rather than exhibiting a gradual lessening of resistance as the temperature is lowered as might be supposed, the electrical resistance of a typical superconductive material, as shown by curve A, gradually decreases with lowering of temperature until a certain critical temperature B is reached whereupon it changes to a "superconductive" state, or condition, in which it has absolutely no resistance rather than gradually decreasing (dotted line curve C) as might be expected. It has been further found that in this "superconductive" condition, any current flowing through the material is confined closely to an extremely thin layer at the surface.

In accordance with the present invention, this lack of electrical resistance is employed to provide a stable and substantially lossless rotatable bearing, a simplified form of which is illustrated by FIG. 2.

As is generally shown therein, there is provided a disk 10 fastened to a vertically positioned shaft 11 which in turn is mounted to rotate about the vertical axis by conventional upper and lower bearings 12 and 13. The force, or magnetic pressure, due to flux 14 of coil 15, between the lower surface of disk 10 and coil 15 and supporting disk.

If disc 10 has been cooled below its critical temperature so that it is superconductive, before coil 15 is energized and if then coil 15 is energized to produce magnetic flux, the magnetic flux 14 as it increases from zero to its final value causes counter electrical currents to be induced in disc 10. These counter currents prevent flux 14 from entering the interior of disc 10. As a result, disc 10 while in a superconductive condition, can be considered to be an insulator for magnetic lines of force. The weight of disk 10 and shaft 11 serve to compress the magnetic lines of flux 14 between disc 10 and coil 15 until the magnetic pressure is sufficient to support disc 10 and shaft 11. It can be shown that this force, or magnetic pressure, is proportional to the square of the flux density B between disk 10 and coil 15, and may be mathematically expressed as follows:

$$F = \left(\frac{B}{5000}\right)^2$$

where B is the flux density in gausses and F represents the force in kilograms per square centimeter.

If the magnetic flux in the gap between coil 15 and disc 10 is constant and the width of this gap decreases, then the flux density increases inversely as the square of the width of the gap. Thus, the smaller the gap, the stiffer the bearing will be since the magnitude of the force acting to separate the two members increases exponentially as the distance decreases.

Since, as has been assumed, disk 10 is "superconductive" or possesses no electrical resistance, the circulating electrical currents therein are completely unimpeded and no electrical loss may be produced therein. Consequently, the only losses that can exist in this construction are those associated with the mechanical bearings 12 and 13, the electrical losses in core 16, and the gas friction acting upon the disk when this disk is rotating about the axis of shaft 11. This latter gas frictional force on disk 10 may be greatly minimized by placing the complete bearing mechanism in a substantially evacuated housing 17 in which a low friction gas such as helium has been substituted for air. Disc 10 rotates about an axis of rotation which coincides with the axis of shaft 11 and is not mechanically prevented, or restrained, from moving in a direction parallel to its axis of rotation, or the axis of shaft 11.

To lower the temperature of the superconductive material sufficiently to reach the "superconductive" temperature condition B, as shown by FIG. 1, housing 17 is preferably completely enclosed within a suitable insulating cover 18 and liquid helium at a temperature of about 4.2 degrees Kelvin (at one atmosphere) is preferably circulated as needed in the space between housing 17 and cover 18 by means such as a helium liquifier and pump mechanism, generally represented as 19. Other means of cooling may, of course, be used.

Since all loss normally associated with the typical magnetic bearing construction is either completely eliminated or reduced to a negligible amount in accordance with the present invention, the source of power used to initially energize coil 15 may be disconnected, as generally shown by FIG. 3, and disk 10 continues to be supported in the manner described above for long periods of time by what may be termed the "entrapped" electrical energy, the direct current flowing through coil 15.

Referring to FIG. 3 for an understanding of the manner by which this is accomplished, there is generally shown the disk 10 supported by the flux 14 generated by coil 15. Connected to coil 15 is the secondary winding 20 of a transformer having a primary winding 21 energized by a battery 22 through a variable resistor 23. Both coil 15 and the transformer windings 20, 21 as well as the disk 10 are preferably made of "superconductive" material having the properties discussed above. However, before the temperature of these parts is lowered below the critical temperature of the "superconductive" material a direct current is passed through primary winding 21 which induces no permanent potential across secondary 20. Then the temperature is lowered below the critical temperature to render windings 21, 20, coil 15, and disk 10 "superconductive" and the current through coil 21 is later reduced to zero by increasing the value of resistor 23. A decreasing current through coil 21 induces a voltage in secondary winding 20 causing a current to flow therein and through winding 15 which produces the flux 14. The generation of flux 14 also induces a circulating current in disk 10 and the reaction of this circulating current with flux 14 provides the force, or magnetic pressure, that raises and supports disk 10 in a floating position above coil 15, as shown.

Since winding 20, coil 15 and disk 10 are all "superconductive," or lack electrical resistance, no electrical losses are generated in these members and the current passing through winding 15 and transformer secondary 20 continues to flow and maintain magnetic lines 14 in the absence of further energization from power source 22. Thus the current circulates through second winding 20 and coil 15 and the flux 14 due to this current provides the force supporting disk 10 for long periods of time in the absence of further energization.

As noted above, the magnetic force operates in a manner analogous to a spring, since the magnetic energy per unit volume in the gap or space between coil 15 and disk 10 increases as the gap is made smaller and decreases as the gap is made larger. Thus the weight of disk 10 and shaft 11 together with the magnetic force form a system which if disturbed oscillates, and the oscillations may continue in the absence of damping force.

To provide such a damping force, or in other words to provide an added effect which will return the oscillating disk to a predetermined suspended or "floated" position, above coil 15 either electrical or magnetic means may be employed. To electrically achieve this damping, the circuit of FIG. 3 may be varied by the addition of a resistor 24 in parallel with both coil 15 and secondary winding 20 as shown by FIG. 4. In this arrangement, it can be shown mathematically that a damping factor will be introduced that may gradually or rapidly diminish oscillations depending upon the ratio of the inductance of windings 15 and 20 to resistance 24. Furthermore, with such a parallel resistance it can be mathematically demonstrated that the magnitude of the flux 14 remains substantially constant with respect to that originally introduced. It is important to note, however, that the addition of a resistance in series (not shown) with winding 15 will vary this relationship and is usually undesirable.

The damping of any oscillatory movement of disk 10 may also be obtained magnetically by the use of iron for the material of core 16. Iron is not one of the materials exhibiting "superconductive" properties at the temperatures involved and hence permits penetration of flux lines 14 and electrical losses that provide damping of the oscillations.

Another preferred manner of generating and entrapping the flux lines 14 is generally shown by FIG. 5, illustrating in enlarged view a bearing arrangement similar to FIG. 2.

In FIG. 5, a power source 22 directly energizes a "superconductive" winding 15 to generate flux 14 which, in turn, produces a circulating current in disk 10 to react therewith and raise and sustain disk 10 as explained above. Thereafter, a "superconductive" short circuit switch 25 is closed to entrap the flux 14, and a second switch 26 is then opened to disconnect power source 22. To provide damping of any oscillations, a ring 27 of conductive, but not "superconductive" material, may be provided about the inner periphery of winding 15, as shown. If disk 10 should oscillate in the direction of its axis of rotation, the air gap between coil 15 and disk 10 varies and leakage flux paths 14a are formed between the layers of winding 15. These leakage flux paths pentrate ring 27 and produce eddy currents in the ring serving to damp oscillatory movements of disk 10.

Figure 6:
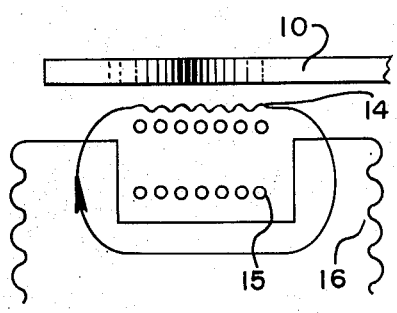
Figure 7A:
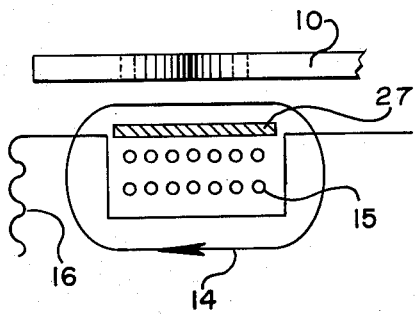
Figure 7B:
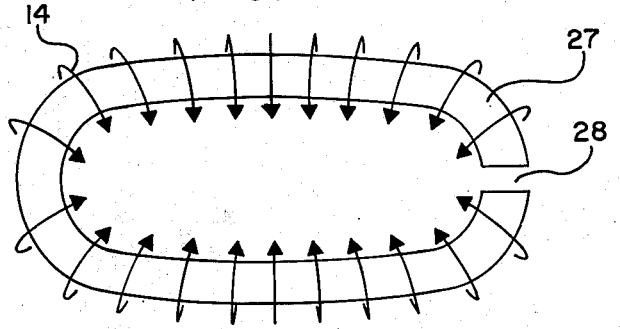

As shown by the enlarged portion of coil 15 in FIG. 6, the flux 14 in the air gap between coil 15 and disk 10 undulates about the individual turns of coil 15. To provide a smoother flux path, a ring 27 of "superconductive" material may be inserted about the upper layer of coil 15, as shown by FIGS. 7A and 7B. It should be noted that the surface of disk 10 which is made of the superconductive material and the surface of ring 27 which opposes the superconductive material surface of disk 10 are both plain surfaces substantially perpendicular to the axis of rotation of disk 10; and that between them they define a gap of substantially uniform width under normal operating conditions. Since flux 14 cannot penetrate a "superconductive" material, the flux lines are compelled to pass over the smooth upper surface of ring 27, and the undulations are accordingly removed, as best shown by FIG. 7A. It is important to note, however, that ring 27 must be interrupted by a small gap 28, as shown by FIG. 7B to prevent the generation of circulating electrical currents in the "superconductive" ring 27 which would cause ring 27 to serve as a magnetic insulator. It should be further noted that the shape of coil 15 and ring 17 may be elliptical as shown by FIG. 7B rather than being circular, if desired.

Figure 8:
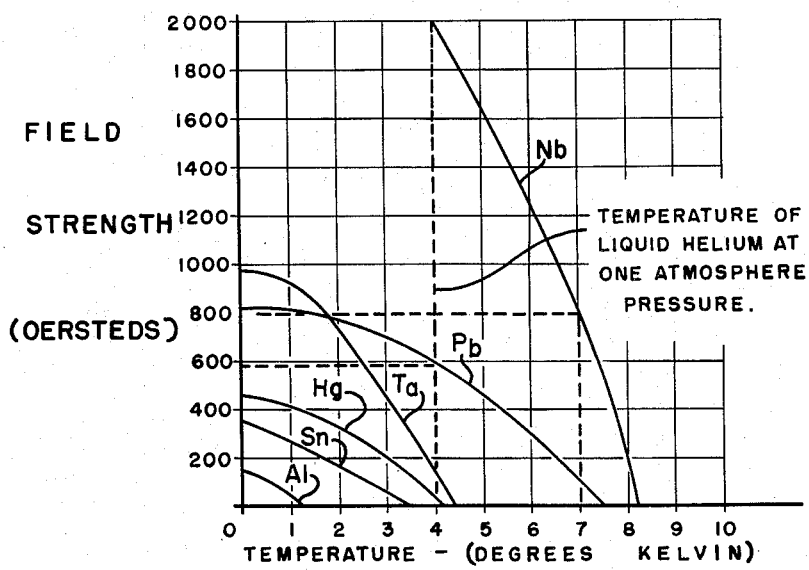

Thus far in this specification, the "superconductive" properties of certain materials have been discussed in connection with preferred embodiments of the present invention utilizing this property. However, one other property of such "superconductive" materials is of considerable importance and this is the effect of magnetic field strength in changing or switching the material from its "superconductive" condition to a condition having finite electrical resistance, or the property of preventing a material from becoming "superconductive" even at sufficiently low temperature where in the absence of a magnetic field, it would become superconductive. This property is illustrated by the curve of FIG. 8 for six preferred "superconductive" materials consisting of niobium (Nb), lead (Pb), tantalum (Ta), mercury (Hg), tin (Sn), and aluminum (Al).

Considering the material niobium in FIG. 8, for example, it is noted that in the absence of a magnetic field (zero magnetic field), this material becomes "superconductive" at little over 8° K., but when the magnetic field strength acting upon the material is 800 oersteds, the temperature must be lowered to below 7° K. before the material may become "superconductive." Similarly, if the magnetic field strength acting upon this material is 2,000 oersteds, the temperature must be lowered to about 4° K. before the material may become "superconductive." Thus, it is noted that for the material niobium there is a "critical" magnetic field strength for each temperature which will destroy the "superconductive" condition if this field strength is exceeded, and hence the condition of becoming "superconductive" depends upon both the temperature and the field strength to which the material is being subjected. Similarly, in the case of other materials, such as lead, it is noted that in the absence of a magnetic field, lead may become "superconductive" at a temperature of little over 7° K. but this condition may be destroyed, for example, if the field strength should exceed 600 oersteds unless the temperature of the lead is also lowered to less than 4° K. Thus, it is evident that of the six materials shown in FIG. 8, the material niobium has the highest "critical" field strength in that it may operate in the "superconductive" condition in the presence of much higher magnetic field strength than any of the other listed materials at the temperatures involved.

Certain alloys, such technetium, are known to have higher critical field strengths than niobium and will become commercially available in the future.

*Permanent Electromagnet Bearing*

Figure 9:
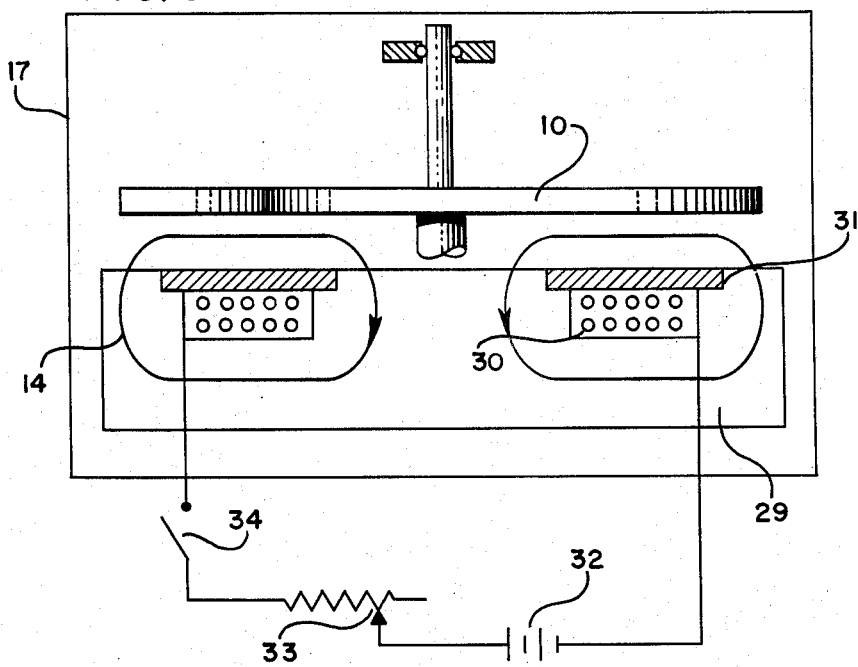
FIGS. 9 and 10 are cross sectional views similar to FIG. 2 depicting "permanent electromagnet" bearing construction in accordance with the present invention.

In the various embodiments of the invention shown by FIGS. 1 to 7 above, the means provided for generating magnetic flux 14 is identified as a coil 15 comprised of a series of windings of "superconductive" wire material such as niobium or the like having a high "critical" field strength. However, although such an arrangement does provide a repelling force on disk 10 which increases as the gap is lessened and decreases as the gap becomes larger, all as discussed above, a certain amount of leakage flux 14a may pass between the layers of coil 15 as best shown by FIG. 5. The effect of this leakage flux is to reduce the "stiffness" of the electrical spring, or stated in another manner, to reduce the repelling force on disk 10 as the gap is lessened over what it would have been had not leakage occurred. To eliminate this leakage flux and provide a "stiffer" spring, coil 15 may be replaced by what may be termed a "permanent electromagnet" as shown by FIG. 9. This is not to be confused with the usual permanent magnet because of the presence of circulating electrical current as will become apparent hereafter.

In FIG. 9, the flux producing device is comprised of a core 29 of iron or other non-superconductive material supporting a winding 30 of niobium or other "superconductive" material having a high "critical" field strength, over which is placed a ring 31 of lead or other "superconductive" material having a lower critical field strength than that of winding 30. In this arrangement, a large circulating current is caused to flow in ring 31 and is "entrapped" therein by the "superconductive" condition of the ring to provide a constant flux 14 for repelling disk 10 and thus provide, in effect, a permanent type of electromagnet. Since a "superconductive" material serves as a magnetic insulator, this flux cannot penetrate any portion of ring 31 and hence no leakage flux may exist as in the winding of FIG. 5.

To induce and entrap a circulating current in ring 31 and entrap flux 14 around ring 31, the complete device of FIG. 9 is first cooled to lower the temperature below the critical temperature of the materials of ring 31, winding 30, and disk 10. Then a switch 34 is closed to direct a current through winding 30; by means of the series connection of power source 32 and variable resistor 33, and this current is increased until the magnetic field succeeds in destroying the "superconductive" condition of lead ring 31 but not that of winding 30 or disk 10. This may be accomplished, since as may be observed from FIG. 8, at any given temperature a lesser magnetic force is needed to destroy the "superconductivity" of lead than is needed to destroy the "superconductivity" of niobium.

After the "superconductive" condition of the lead ring is destroyed, the flux generated by winding 30 may penetrate the lead, since it is no longer "superconductive" and hence no longer a magnetic insulator. In the final step, the magnetic field is reduced to allow the lead ring to again become "superconductive." Then switch 34 is opened. However, since the flux was passing through ring 31 prior to the reduction of the field, the reduction of this flux generates a circulating current in ring 31 and the return of this ring to a "superconductive" condition "entraps" the magnetic flux around ring 31 and consequently provides what may be termed a permanent electromagnet producing a constant flux 14 having no leakage paths. Since core member 29 is not of superconductive material but may be of iron or other non-superconductive material, the passing of flux 14 through core 29 and the variation of this flux as disk 10 oscillates, provides eddy current losses which serve to damp out or correct for the oscillations and maintain the disk 10 in a "floating" condition at a predetermined distance above ring 31.

In the device of FIG. 9, the strength of the magnetic field producing flux 14 is limited by the critical field strength of the lead ring since the operation of this lead ring as a "permanent electromagnet" depends upon maintaining ring 31 in a "superconductive" condition, and accordingly a magnetic field greater than the "critical" field strength for lead, of course, would destroy this condition. In any superconducting bearing, the maximum magnetic flux density must be less than the critical magnetic field strength of the materials from which the bearing is formed at the temperature at which the materials are maintained. Accordingly, in applications where greater field strengths than that obtainable from lead are needed, niobium or other superconductive materials possessing a higher critical field strength may be used in the "permanent electromagnet" arrangement illustrated by FIG. 10 or FIG. 13.

Figure 10:
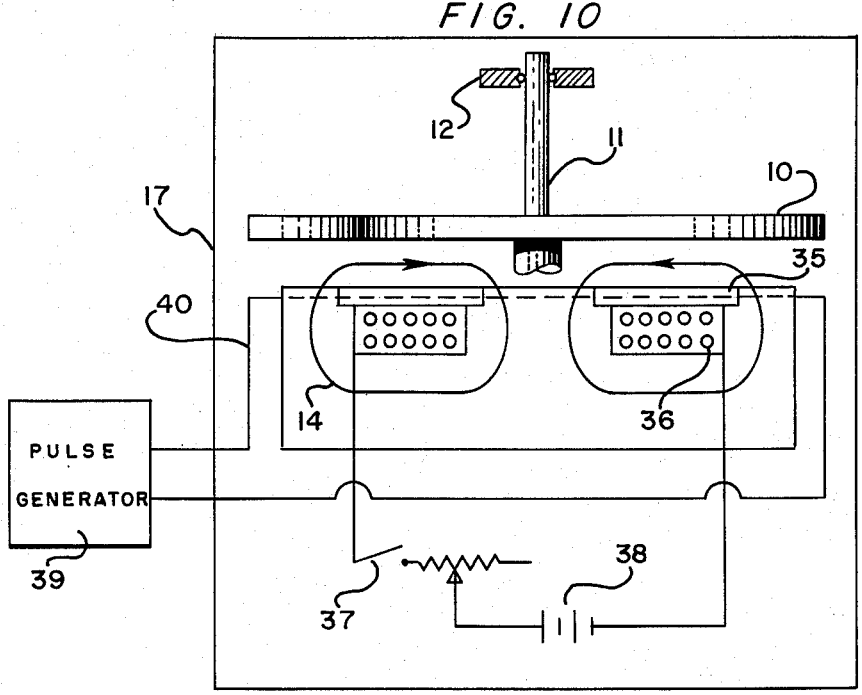
Figure 11:
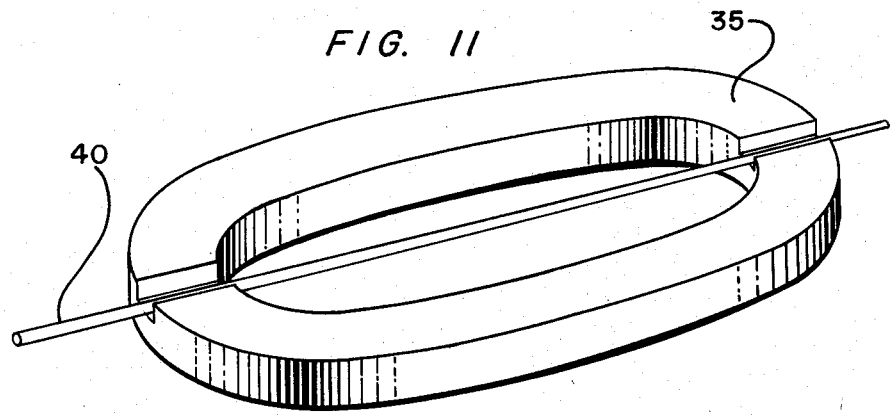
FIGS. 11 and 13 are perspective views illustrating "permanent electromagnet" rings employed in FIG. 9 or 10.

In FIG. 10, ring 35 together with winding 36 and disk 10 may all be of niobium or other "superconductive" material possessing a high "critical" field strength, and accordingly a different means for inducing a circulating current and entrapping a magnetic field about ring 35 is needed than with the lead ring 31 of FIG. 9. In FIG. 10, the complete bearing structure is again cooled to a sufficiently low temperature to render disk 10, ring 35, and coil 36 in a "superconductive" condition, and a switch 37 is then closed attempting to produce a magnetic field about ring 35. However, since ring 35 is in "superconductive" condition and operates as a magnetic insulator, this magnetic field cannot penetrate the ring. A short impulse of electrical current produced by pulse generator 39 is then directed through a heater wire 40 passing through a slot formed in ring 35, as best shown by FIG. 11, serving to heat ring 35 sufficiently to destroy the "superconductive" condition of portions of the ring in the vicinity of the wire and permit the flux produced by winding 36 to penetrate this ring. Upon the decay of this short electrical pulse and the cooling of ring 35, its "superconductive" condition is regained and a circulating current is established in ring 35, which current produces flux lines 14 to complete the formation of ring 35 as a "permanent electromagnet". Finally, energization of coil 36 is reduced by increasing the resistance and then switch 37 may be opened to de-energize winding 36, since the field generated thereby is no longer needed.

Figure 12:
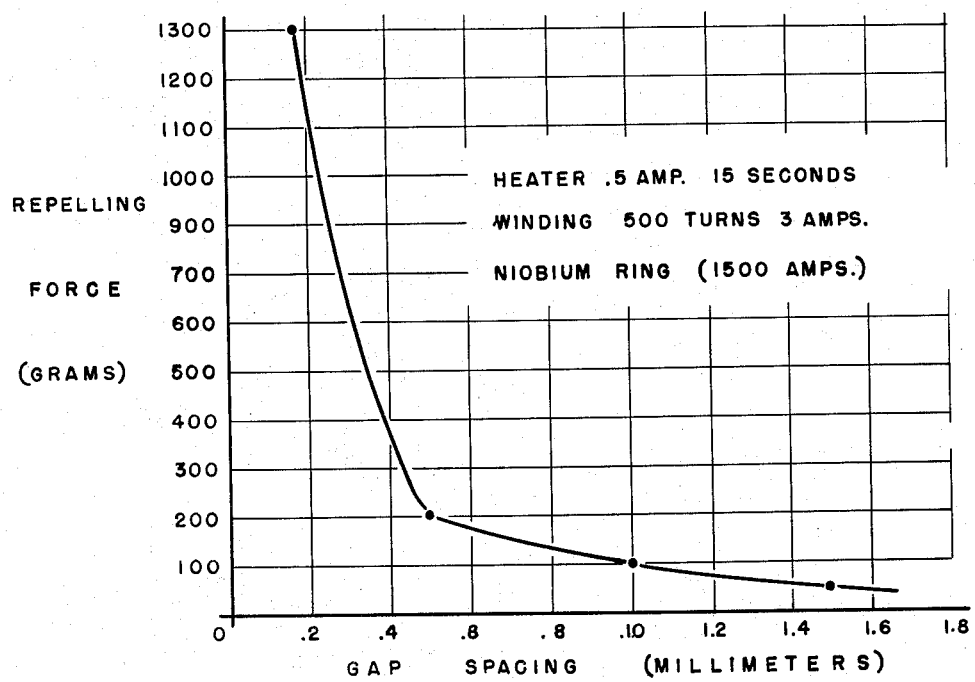
FIG. 12 is a graph showing the performance of the bearing of FIG. 10.

"Permanent electromagnet" bearings that have been constructed in accordance with the embodiment shown by FIG. 10 have provided repelling forces of over 3 kilograms. For example, a typical construction employing a niobium winding 36 having 500 turns and carrying a magnetizing current of 3 amperes (1500 ampere turns) together with a single ring 35 of niobium has yielded repelling forces varying from about 50 grams to 1300 grams per square centimeter as the spacing between disk 10 and ring 35 was varied from 1.5 mm. to .175 mm., respectively. The actual variation in force with gap spacing is shown by FIG. 12 illustrating the rather rapid nonlinear rise in repelling force as the gap between the supported disk 10 and the "permanent electromagnet" ring 35 is made smaller. As further noted from FIG. 11, the heater wire 40, which is preferably made of nichrome or even copper having electrical resistance at the low temperatures involved, received a pulse of current having a maximum value of .5 ampere for a duration of about .15 second.

Figure 13:
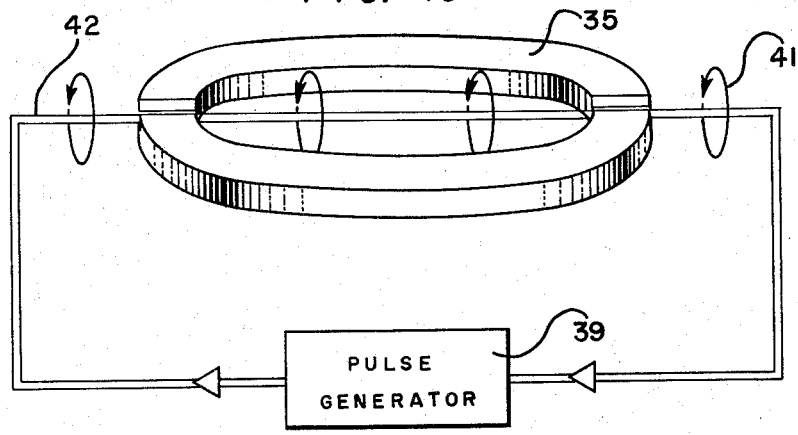

Rather than heating the ring 35 to temporarily destroy its "superconductive" condition as in FIG. 10, it may be preferred to do this by generating an additional magnetic field 41, by suitable means such as directing a large electrical current through a highly conductive wire 42 of copper or the like as shown in FIG. 13. This additional field 41 when added to the main field flux 14 exceeds the critical field strength and serves to destroy the "superconductive" condition of ring 35 permitting the magnetic field generated by winding 36 to penetrate ring 35. Upon decay of this additional magnetic field 41 and the return of ring 35 to its "superconductive" condition an electrical current flows through ring 35 to provide a "permanent electric magnet" in a manner similar to that described above.

*Multiple Axis Bearings*

For the purpose of simplifying the presentation of various features of the invention, these features have been thus far illustrated and described in connection with a disk member 10 supported about its rotative axis by conventional mechanical bearings 12 and 13 and floated about its vertical axis by the pressure means employing the present invention. For supporting variously shaped members completely out of physical contact with a support by means of the present invention, reference is made to FIGS. 14 and 15 illustrating one preferred support for completely floating a cylindrically shaped member 43 about all of its axes.

Figure 14:
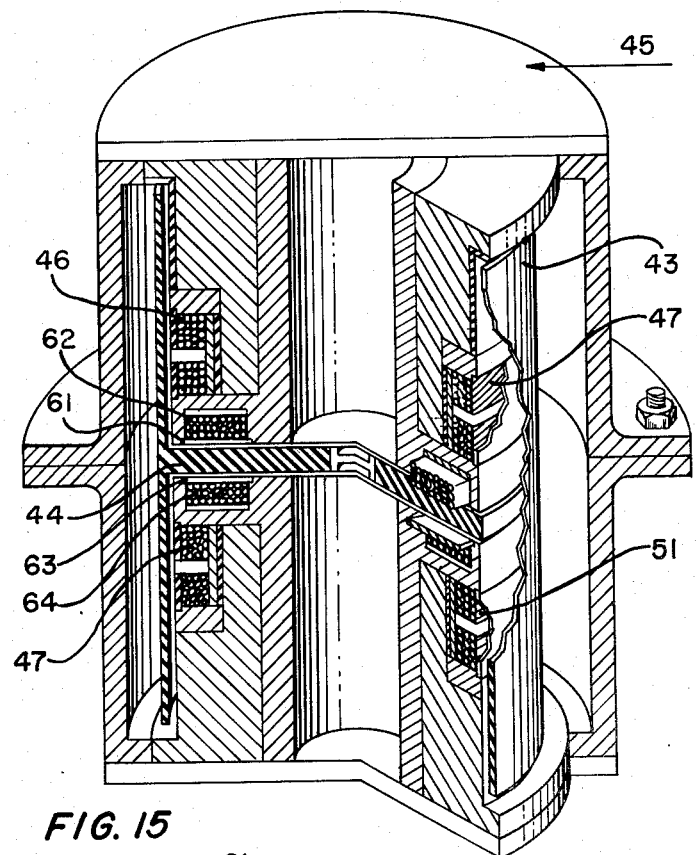
FIG. 14 is a sectional view, partly perspective, of bearings to support a cylindrical rotor so that the rotor has three degrees of freedom.
Figure 15:
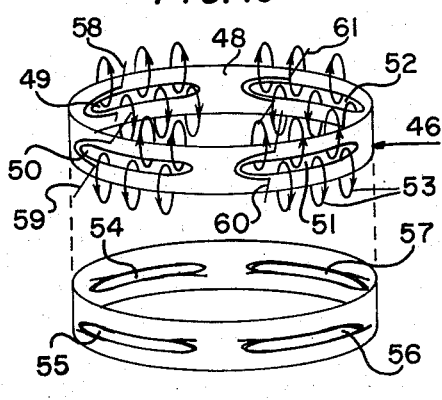
FIG. 15 is an enlarged exploded schematic view of a portion of the magnetic devices of FIG. 14.

As shown by FIGS. 14 and 15, a cylindrically shaped open-ended member, generally designated 43, is provided having a wall 44 dividing the cylinder into upper and lower sections. Projecting into each of these sections are two confronting pole members supporting permanent electromagnets to completely float cylinder 43 out of contact with the poles.

The upper pole member supports a series of permanent electromagnets 46 concentrically arranged about the outer periphery of the pole to exert lateral forces about the inner surface of cylinder 43 together with a vertically arranged permanent electromagnet 61 to provide a vertical force upon the cylinder acting downwardly upon dividing wall 44. Similarly the lower pole member supports a series of permanent electromagnets 47 concentrically arranged about the outer periphery of the pole to exert lateral forces about the inner surface of the cylinder together with a vertically arranged permanent magnet 63 to provide a vertical force acting upwardly upon wall 44 dividing the cylinder. By means of these permanent electromagnets, cylinder 43 is completely supported by the electrical pressure forces of the present invention in both the lateral and vertical directions.

As more clearly shown by the enlarged exploded view, FIG. 15, the upper series of permanent electromagnets 46 are preferably formed of the unitary ring, or cylinder, 48 of superconductive material made concentric with the inner surface of cylinder 43 but having a slightly smaller diameter so as to form a gap between cylinder 43 and ring 48, and having four slitted openings 49, 50, 51, and 52 passing through the ring at adjoining portions about its circumference to provide four permanent electromagnets, as indicated by the schematic flux lines 53. To energize each of these permanent electromagnets there is provided inside of ring 48 and in alignment with each of the slitted openings, a separate electrical winding 54, 55, 56, and 57, respectively, all being energizable in series or parallel, as desired, to provide the initial magnetic fields necessary to penetrate superconductive ring 48. For destroying the superconductive state of ring 48 enabling magnetic flux to penetrate therein, four heater wires 58 to 61, inclusive, are placed in suitably formed grooves in the ring in a manner similar to that illustrated by FIG. 11. The formation of the permanent electromagnets is similar to that described above in connection with FIG. 10; namely, the complete members are first cooled to achieve a superconductive state and windings 54 to 57 are energized to produce magnetic fields. Then, the superconductive state of the four permanent electromagnets is destroyed by momentarily energizing the four heater wires 58 to 61 to permit penetration of the flux, and upon return of those portions of ring 48 to a superconductive state, and electrical currents flow in four separate circulating current paths (flowing about the slitted openings 49 to 52) to complete the formation of the four permanent electromagnets. Thereafter, coils 54 to 57 are deenergized, as discussed above.

The lower series of permanent electromagnets, generally designated 47, are similar in construction to the upper permanent electromagnets 46 and the net effect of the upper and lower series is to centrally support cylinder 43 within housing 45 so that it has three degrees of freedom.

To support and float cylinder 43 in the vertical direction, the upper pole member of support 45 carries at its base a permanent electromagnet 61 and related coil 62, and the lower pole carries a permanent electromagnet 63 and related coil 64, as shown. These upper and lower permanent electromagnets 61 and 63 may, if desired, be merely single ring constructions similar to that depicted by FIGS. 10 and 11. Thus, it is evident that the bearings of the present invention may be employed to either partially or completely support members having a wide variety of configurations.

As an alternative to the permanent electromagnetic ring constructions 46 and 47 of FIG. 14, it may in some instances be desirable to provide a ring 48 or other endless member having no slitted openings therein, and to provide a different means for forming a plurality of separate electrical conducting paths about this ring. One manner of achieving this is to provide such a member that is formed of non-superconductive material having deposited thereon by means of sputtering, plating, or the like a series of individual flat rings of superconductive material positioned about its outer surface (not shown). Since a substantially infinite current may flow through a material in its superconductive state, these deposited flat rings may be extremely thin and provided in any endless configuration desired.

The term "superconductive state" or "superconductive condition" as used throughout this specification and claims denotes a condition of absolutely no electrical resistance, insofar as any known measuring means has been able to determine, and the use of the term "superconductive material" includes not only solid members which are wholly comprised of material possessing this unique characteristic but includes members that may be comprised of non-superconductive materials such as copper or iron, provided with an outer thin layer or covering of superconductive material. For example, disk 10, coils 15, disk 35 and others of the disclosed members discussed above may all be constructed of common inexpensive materials over which is blanketed a thin layer of niobium or other superconductive material. Since one of the unique characteristics of a superconductive material is that any electrical current flows very close to the surface, an extremely thin outer layer of superconductive material provides the necessary path of infinite conductivity. Actual measurement has shown that this layer in most instances need be no thicker than one ten thousandth of an inch, since substantially all current flow is this close to the surface.

It has been found that twenty-one different metallic elements and a large number of alloys become superconducting at varying temperatures for each material from as low as 0.35° K. for hafnium to about 8° K. for niobium. Some alloys have been found to possess even higher superconductive state temperatures, the highest presently known being about 15.5° K. for niobium nitride. The known superconductive material elements in the periodic system are Al, Zn, Ga, Cd, In, Sn, Hg, Tl, Tb, Ru, Re, Os, U, Th, Hf, Ta, Zr, Nb, B, Ti, and La.

Although the present invention has been disclosed in connection with the support of but a flat disk member and a cylindrically shaped member, it is believed evident that many differently shaped two and three dimensional objects of regular or irregular configuration may be supported without departing from the spirit and score of the invention by merely rearranging the shape, size, thickness, and the like of the coils, permanent electromagnets, support base, and other structural members. Furthermore, many combinations of the various features of the present invention may be made without the exercise of invention in the light of the present teachings. Accordingly, this invention is to be considered as being limited only by the following claims appended hereto.

What is claimed is:

1. In an electrical pressure bearing construction, a member to be supported and a supporting member proximate thereto, said supporting member including an electrical winding energizable by a power source to produce a magnetic field operating against said supported member, said supported member and said winding having at least a thin outer layer of superconductive material, superconductive means for short circuiting said winding after energization, a container for enclosing said members and said short circuiting means, means for evacuating the air within the container and substituting lower friction gas therefore, and means for lowering the temperature of said container and its members to bring said winding, supported member, and switch means to a superconductive state.

2. In an electrical pressure bearing construction, a member to be supported and a supporting member proximate thereto, said supporting member including electrical conducting means defining an endless path for the flow of electrical current positioned adjacent said member to be supported, means for generating a circulating electrical current to flow through said endless path for generating a magnetic field operating against said supported member, both said supported and supporting members having at least a thin outer layer of superconductive material covering portions thereof in the presence of the magnetic field, and means for lowering the temperature of said members to render said layers in a superconductive condition.

3. In the bearing of claim 2, said means for lowering the temperature of said members including a container completely enclosing said members and means for circulating liquid helium about said container.

4. In an electrical pressure bearing construction, a member to be supported having at least an outer layer of superconductive material, a supporting structure member including an electrical winding having at least an outer superconductive layer and being energizable to produce a magnetic field, a core member for housing said winding, and a ring of material having at least an outer layer of superconductive material positioned above said winding in proximate spaced relation to said member to be supported, cooling means for lowering the temperature of said supported and supporting members to transform said superconductive material layers into superconductive state, means for temporarily destroying the superconductive state of only said ring to permit penetration of the magnetic field, and means for deenergizing said winding after said ring has regained its superconductive condition.

5. In the bearing of claim 4, said destroying means including a heater wire supported adjacent said ring and being energizable by an electrical impulse of short duration to heat said wire and ring to momentarily destroy the superconductive state of the ring.

6. In the bearing of claim 4, said destroying means including a second winding supported adjacent said ring and being energizable by an electrical impulse to provide a second magnetic field which when added to the first magnetic field momentarily destroys the superconductive state of the ring.

7. In an electrical pressure bearing construction, a member to be supported and a supporting member proximate thereto, said supported member having at least a thin outer layer of superconductive material covering the portions of the supported member confronting portions of the supporting member, said supporting member including electrically energizable means to produce a magnetic field operating against said supported member, and means for lowering the temperature of said members to bring said supported member to a superconductive state, and damping means responsive to variations in the magnetic field for restraining oscillatory movement between the supporting and supported members.

8. In an electrical pressure bearing construction, a member to be supported and a supporting member proximate thereto, both said members having at least a thin outer layer of superconductive material covering the portions thereof in confronting relation, said supporting member including electrically energizable means to produce a magnetic field operating against said supported member, means for lowering the temperature of said members to bring said members to a superconductive state and dampening means responsive to variations in the magnetic field for restraining oscillatory movement between the supporting and supported members.

9. In an electrical pressure bearing construction, a member to be supported, said supported member having at least an outer layer of superconductive material, a base, a permanent electromagnetic device supported by the base in proximity to said supported member for producing a magnetic field to float said supported member, said permanent electromagnetic device comprised of a material having at least an outer layer of superconductive material, means for inducing a circulating electrical current to flow through said material, said inducing means including an electrical winding supported by the base and energizable by a power source to produce a magnetic field adjacent said device, means for lowering the temperature of the bearing to bring said winding, said device, and member to a superconductive state, and electrical means momentarily energizable after the energization of said winding for destroying the superconductive state of only said permanent electromagnetic device and permitting the magnetic field generated by said winding to penetrate said device, and upon being deenergized enabling said device to regain its superconductive state whereby a direct circulating current is established in the superconductive material of said permanent electromagnetic device.

10. In the bearing construction of claim 9, shielding means having at least an outer layer of superconductive material supported by said base and confining the magnetic field produced by said permanent electromagnetic device to follow a predetermined path.

11. In an electrical pressure bearing construction, a member to be supported, said supported member having at least an outer layer of superconductive material, a base, a permanent electromagnetic device carried by the base in proximity of said supported member for producing a magnetic field to float said supported member, said permanent electromagnetic device comprised of a material having at least an outer layer of superconductive material, and means for inducing a circulating current to flow through said device, said inducing means including an electrical winding supported by the base and energizable by a power source to produce a magnetic field adjacent said device, means for lowering the temperature of the bearing to bring said winding, device, and member to a superconductive state, said winding being comprised of at least an outer layer of superconductive material, the superconductive material of said supported member and said winding differing from that of said device in having a higher critical field strength, and means enabling the energization of said winding to produce a magnetic field exceeding the critical field strength of said device but lower than the critical field of said winding and member thereby to destroy the superconductive state of said device and permit the magnetic field to penetrate said device, said enabling means also permitting the reduction of said energization to allow said device to regain a superconductive state, thereby to establish a circulating current therein and provide a permanent electromagnet.

12. In an electrical pressure bearing construction, a member to be supported and a supporting member proximate thereto, said supporting member including an electrical winding energizable by a power source to produce a magnetic field operating against said supported member, a transformer having a primary and secondary winding with the secondary winding being connected to said electrical winding and said primary winding being energizable by a power source to induce a circulating current through said secondary winding and said electrical winding; said transformer windings, electrical winding, and member to be supported having at least a thin outer layer of superconductive material, and means for lowering the temperature of said members to bring said superconductive materials to a superconductive state, thereby causing a direct current to continuously flow through said secondary winding and said electrical winding.

13. In the pressure bearing of claim 12, damping means responsive to variations in the magnetic field for restraining oscillatory movement between the supported and supporting members, said damping means including an electrical resistance in parallel circuit connection with said electrical winding and said secondary winding.

14. In an electrical pressure bearing construction, a member to be supported having at least an outer thin layer of superconductive material, a base, an electrical winding carried by said base in confronting relation to said supported member at least a part of the wire forming the electric winding being comprised of superconductive material, said winding being energizable by a power source to generate a magnetic field between said member and said winding, cooling means for lowering the temperature of the member and the electrical winding below the critical temperatures of their superconductive materials, said base including damping means formed of non-superconductive material positioned in the path of said magnetic field, whereby variations in the magnetic field induce electrical losses in said damping means.

15. A plurality of permanent electromagnet elements in an integral unitary assembly including; a member having at least an outer thin layer of superconductive material, said member being formed with a plurality of unconnected openings therethrough in the arrangement of elements desired, means for cooling said member to transform said superconductive material into its superconductive state, means generating a magnetic field about the member in the presence of each opening, and means temporarily destroying the superconductive state of the member about each of its portions forming a separate opening to permit penetration of the magnetic field whereby upon the superconductive state being regained, a plurality of electrical currents flow within the member, each of said currents circulating about one of said openings.

16. A plurality of permanent electromagnet elements in an integral unitary assembly including; a member of non-superconductive material, a plurality of separate endless path layers of material deposited over different portions of the surface of said member in the arrangement of elements desired, means for cooling said member to transform said layers into the superconductive state, means generating a magnetic field about the member in the presence of each endless path layer, and means for temporarily destroying the superconductive state of the layers to permit penetration of the magnetic field whereby upon the superconductive state being regained a plurality of electrical currents are entrapped in the member, each circulating through one of the endless path layers.

17. A bearing comprising a first member having a surface, a second member having a surface, means mounting said second member so that corresponding portions of the surfaces of said second member are substantially parallel to corresponding portions of the surface of the first member, said surface of said first member being coated with a first material, which first material is a superconductor when cooled below a given critical temperature, means for cooling said first material below its critical temperature, and means of said second member for establishing a magnetic field between the surfaces of said first and second members, the magnitude of the magnetic flux between the surfaces of said first and second members remaining substantially constant.

18. A bearing comprising a first member having a substantially planar surface, at least a portion of said surface being coated with a first material, said first material being a superconductor when cooled below its critical temperature, a second member having a substantial planar surface, means for mounting said first and second members so that the planar surfaces of said member are substantially opposite each other to define a gap, means for cooling the first material of said first member below its critical temperature, and means on said second member for establishing a substantially constant magnetic field in the gap between said members.

19. A bearing surface comprising a first member having a substantially cylindrical surface, at least a portion of said surface being coated with a first material, said first material being a superconductor when cooled below a certain critical temperature, a second member having a substantially cylindrical surface concentric with the cylindrical surface of said first member, the diameter of the cylindrical surface of the second member being less than the diameter of the cylindrical surface of the first member, means for mounting the first and second members so that the concentric surfaces of said first and second members define a gap, means for cooling the first material below its critical temperature, and means mounted in said second member for establishing a magnetic field of substantially constant polarity and magnitude in said gap.

20. A bearing comprising a first member mounted for rotation about an axis and for linear motion in the direction of said axis, said member having a surface substantially at right angles to its axis of rotation, said surface being substantially covered with a material which is a superconductor when the temperature of said material is below a critical temperature, a second member having a substantially planar surface, means for mounting said second member with respect to said first member so that the surfaces of said first and second members are substantially parallel, the space between said surfaces of said first and second members defining a gap, means mounted on said second member for establishing a substantially constant magnetic field in said gap, the lines of force of said magnetic field in the gap between the superconductive material of said first member and the planar surface of said second member being substantially perpendicular to the axis of rotation of said first member, and means for cooling said first member so that its temperature is below said critical temperature.

21. A bearing comprising a first member and a second member adapted to be mounted proximate to one another, a portion of the surface of the first member that confronts the second member being formed of a superconductive material, a portion of the second member being comprised of a superconductive material, said bearing adapted to be maintained at a temperature such that the superconductive materials of the first and second members are below the temperature at which they can become superconductive, and electrical means for entrapping magnetic flux around the superconductive material of the second member to produce a magnetic field between the second member and the superconductive layer of the first member.

22. A bearing comprising a first member and a second member, means for mounting said members proximate to one another but spaced apart, a portion of the first member that confronts the second member being comprised of superconductive material, a coil mounted on said second member, said coil being comprised of a superconductive material, circuit means comprised of a superconductive material connected in parallel to said coil, said bearing adapted to be maintained at a temperature such that the superconductive materials of the first member, the coil and the circuit means, are below their critical temperatures, first means for connecting a source of direct current to said coil so that current flows through the coil to produce a magnetic field between the second member and the superconductive material of the first member, means for preventing current from flowing through said circuit means, means for disabling said means for preventing current from flowing through said circuit means to provide a short circuit for said coil of substantially zero resistance after a magnetic field has been established by current from said source flowing through said coil, and means for disconnecting the first means from said coil.

23. A bearing comprising a first member and a second member, means for mounting said members proximate to one another, a portion of the surface of the first member that confronts the second member being formed of a superconductive material, a coil mounted on said second member, the outer layer of said coil being a superconductive material, circuit means connected in parallel with said coil, said circuit means being comprised of superconductive material, means for lowering the temperature of the bearing so that the superconductive materials of the first member, the coil and the circuit means, are below the temperature at which they can become superconductive, electrical means adapted to be connected to a source of electrical energy for causing current to flow through said coil to produce a magnetic field between the second member and the superconductive layer of the first member, means for causing the circuit means to form with said coil a closed electrical circuit of substantially zero resistance through which current will flow to maintain said magnetic field after the source of electrical energy has been disconnected from said electrical means as long as the resistance of the closed electrical circuit remains substantially zero.

24. A bearing comprising a first member and a second member proximate thereto but adapted to be spaced apart to form a gap between said members, corresponding portions of said members which are in confronting relationship being comprised of superconductive materials, the superconductive material of the second member forming a closed loop, said superconductive materials adapted to be maintained at a temperature so that they can be in their superconductive condition, the superconductive materials of both members being shaped to form a gap of substantially uniform width, a coil mounted proximate to said loop of superconductive material, means for causing an electrical current to flow through said coil to create a magnetic field, means for momentarily destroying the superconductivity of the loop so that said field can penetrate said loop, and means for disconnecting said means for causing an electrical current to flow through said coil from said coil after said loop becomes superconductive whereby a magnetic field is entrapped around said loop and between the first and second members.

25. In a device of the type described having a member, an element of said member being made of a superconductive material and capable of forming a closed electrical loop of substantially zero electrical resistance; the improvements comprising means for entrapping a magnetic field about said element, comprising the steps of reducing the temperature of the superconductive material to a temperature less than its critical temperature, establishing electromagnetically a magnetic field in proximity to said element, increasing the resistance of at least a portion of the superconductive material so that the resistance of the loop is greater than zero, decreasing the resistance of the loop substantially to zero and then destroying said electromagnetically established field.

26. In a bearing having a first member and a second member adapted to be mounted proximate to one another but spaced apart, a portion of the first member that confronts the second member being comprised of a superconductive material, a coil mounted on said second member, said coil being comprised of superconductive material, and circuit means comprised of a superconductive material connected in parallel with said coil; the improvements comprising entrapping magnetic flux about said coil which comprises the steps of lowering the temperature of the superconductive materials of the coil and the circuit means to a temperature less than their critical temperatures, increasing the resistance of the circuit means so that it is greater than zero, causing current from a source of electric current to flow through the coil to establish a magnetic field, reducing the resistance of said circuit means to substantially zero, and stopping the flow of current from the source of electric current through said coil.

27. In a cryogenic bearing having a first member and a second member adapted to be mounted proximate to one another, a portion of the surface of the first member that confronts the second member being formed of a superconductive material, a portion of the second member comprising a closed loop of superconductive material, and a coil mounted on said second member near said closed loop; the improvements comprising means for entrapping a magnetic field about the closed loop comprising the steps of reducing the temperature of the bearing until the superconductive material of the closed loop is below its critical temperature, energizing said coil to produce a magnetic field, destroying momentarily the superconductivity of at least a portion of the closed loop, returning said closed loop to its superconductive condition, and de-energizing said coil.

References Cited in the file of this patent

UNITED STATES PATENTS

| | | |
|---|---|---|
| 2,377,175 | Peer | May 29, 1945 |
| 2,566,221 | Lovell | Aug. 28, 1951 |
| 2,699,365 | Indergand et al. | Jan. 11, 1955 |

OTHER REFERENCES

"Forces Acting on Superconductors in Magnetic Felds," Journal of Applied Physics, volume 24, Number 1, January 1953, pages 19 to 24.